United States Patent [19]
Staser et al.

[11] Patent Number: 6,119,407
[45] Date of Patent: Sep. 19, 2000

[54] VEHICLE DOOR MODULE

[75] Inventors: Brian Hale Staser, Troy; Mark Manuel, Shelby Township, Macomb County; Robert P. Racklyeft, Brownstown Township, Wayne County, all of Mich.

[73] Assignee: Delphi Technologies, Inc., Troy, Mich.

[21] Appl. No.: 09/216,655

[22] Filed: Dec. 18, 1998

[51] Int. Cl.[7] ........................................ B60J 5/04
[52] U.S. Cl. ................................................ 49/502
[58] Field of Search ...................... 49/502; 296/146.5, 296/146.6

[56] References Cited

U.S. PATENT DOCUMENTS

| | | | |
|---|---|---|---|
| 4,831,710 | 5/1989 | Katoh et al. | 49/502 X |
| 4,974,365 | 12/1990 | Ono | 49/502 |
| 5,308,138 | 5/1994 | Hlavaty | 49/502 X |
| 5,379,553 | 1/1995 | Kimura et al. | 49/502 |

*Primary Examiner*—Jerry Redman
*Attorney, Agent, or Firm*—Patrick M. Griffin

[57] ABSTRACT

A vehicle door module including window glass is presented which includes a box section belt having an angled bolt attachment and a double overlap attachment to maintain strength and rigidity of the door assembly. The incorporation of the box section belt to the vehicle door module permits the inclusion of the window glass and various parts of the lift system. The angled bolt attachment provides for efficient load transfer between the belt and the door frame through load sharing face contact and a bolt. The double overlap attachment provides for efficient load transfer through a lap joint and clamping forces provided by a bolt. The double overlap attachment further includes features which facilitate assembly while compensating for manufacturing tolerances and build variability. An embodiment of the double overlap joining includes interlocking ridges which engage to further enhance load transfer capability. The vehicle door module further includes a hardware support cross member, a window and lift system, an inside latch system, wire harness assembly, speaker, and other door components.

23 Claims, 2 Drawing Sheets

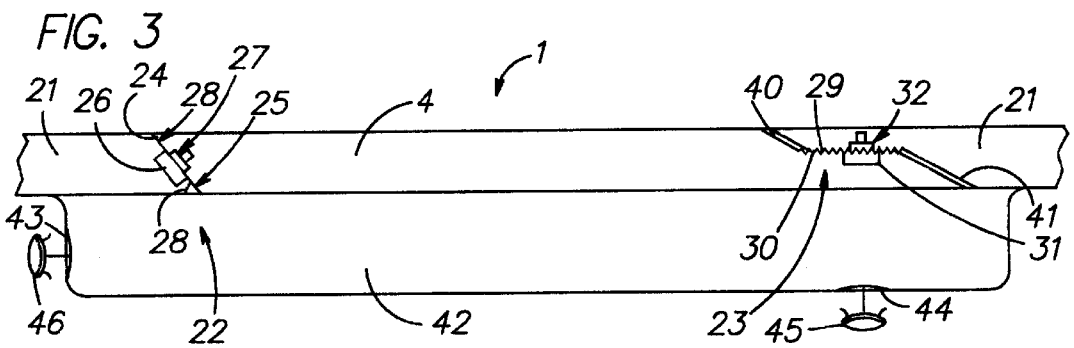
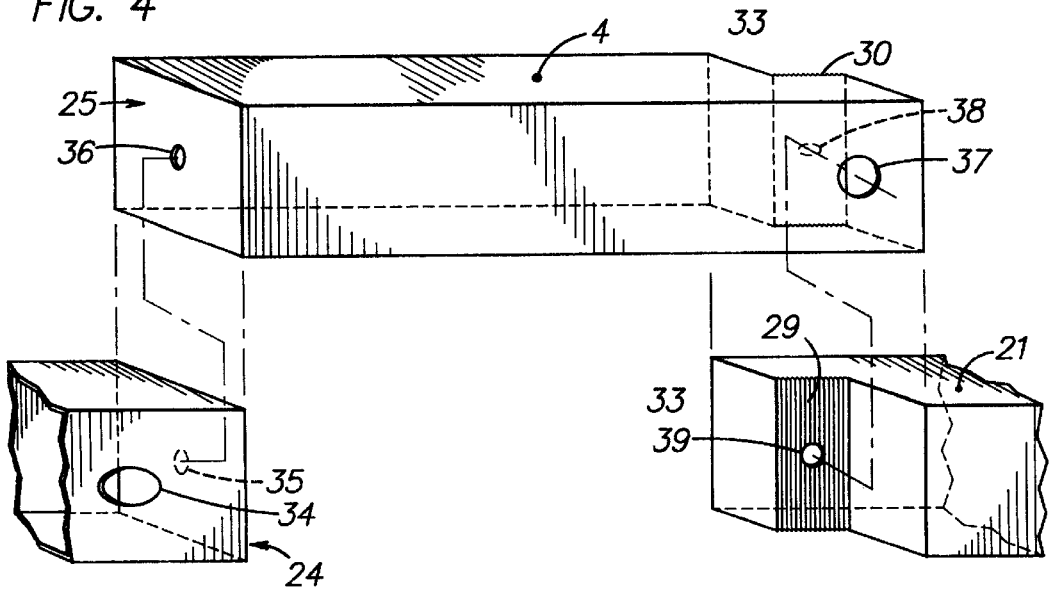
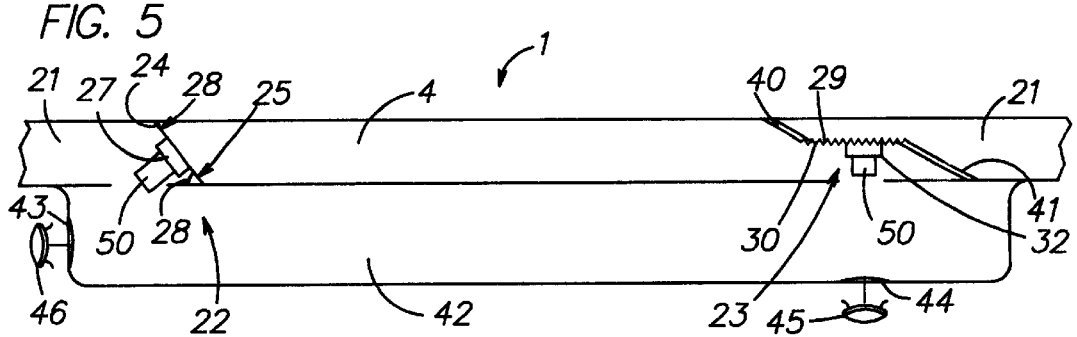

VEHICLE DOOR MODULE

TECHNICAL FIELD

This invention relates generally to door structure for a vehicle. In particular, this invention relates to a vehicle door structural hardware module including glass.

BACKGROUND OF THE INVENTION

It is well known in the design and manufacture of vehicles to incorporate many parts into subassemblies to increase manufacturability. These subassemblies, commonly called modules, include a number of interrelated parts which can be assembled quickly and easily and then subsequently incorporated into the final assembly of a vehicle. Many of the modules concern structural portions of the vehicle and it is important in the design of these structural modules to provide the requisite structural stiffness and integrity while simultaneously ensuring the benefits of a modular design.

One such structural module is a structural panel within a vehicle door. Current state of the art door modules include a hardware support cross member, wiring harnesses, inside handle and latch system and window regulator and other components. Typical functional and reliability tests are performed on the module and its components prior to installation into a door frame to facilitate testing and trouble shooting. Once testing is complete the module is loaded into a door frame from the inboard side.

The door frame of a typical vehicle reacts and transmits loads among its members to predetermined locations. For instance, loads that are transmitted into the door from the vehicle or operation of the door are reacted within the door structure and subsequently transmitted to the body of the vehicle at the attachment points. A typical door frame is a monocoque structure which includes structural members integral with the periphery of the door and a belt which is a structural member positioned within the periphery below the window opening. The belt provides a fore-aft load path to increase strength and stiffness of the door which are compromised by the window opening. In some prior art embodiments, the belt is comprised of a box section structural member. section structural member.

Because the belt is a continuous member traversing the door frame in a fore aft direction, the window glass must be installed into the below belt window guides behind the belt separate from the module. Once the module and window glass are installed in the door frame, the regulator, including motor and lift and guidance system, is then connected to the window glass and is tested.

SUMMARY OF THE INVENTION

This invention offers advantages and alternatives over the prior art by providing a vehicle door module, including window glass, which includes specific structural hardware and attachments to facilitate assembly and maintain strength and rigidity of the door assembly.

The vehicle door module of the present invention preferably includes a includes box section belt, hardware support cross member, a window glass, and regulator, including below belt lift and guidance system. In addition, the vehicle door module further includes an inside handle and latch system, wire harness assembly, speaker, and other door components. The incorporation of the box section belt to the vehicle door module permits the inclusion of the window glass and various parts of the below belt lift and guidance system. A novel attachment scheme maintains the strength and rigidity of prior art door assemblies.

The attachment scheme includes an angled bolt attachment and a double overlap attachment. The angled bolt attachment provides for efficient load transfer between the belt and the door frame through load sharing face contact and a fastener. The double overlap attachment provides for efficient load transfer through a lap joint and clamping forces provided by a fastener. The double overlap attachment further includes features which facilitate assembly while compensating for manufacturing tolerances and build variability. An embodiment of the double overlap joint includes interlocking ridges which engage to further enhance load transfer capability.

The above discussed and other features and advantages of the present invention will be appreciated and understood by those skilled in the art from the following detailed description and drawings.

BRIEF DESCRIPTION OF THE DRAWINGS

The present invention will now be described, by way of example only, with reference to the accompanying drawings wherein like elements are numbered alike in the several Figures:

FIG. 3 is a cross sectional view taken substantially along line 3—3 in FIG. 2 showing the attachment of a box section belt and door frame;

FIG. 4 is an isometric diagrammatic view of the box section belt and door frame of FIG. 3; and FIG. 5 is an alternative embodiment for attachment of the box section belt.

DESCRIPTION OF THE PREFERRED EMBODIMENT

Figure 1:
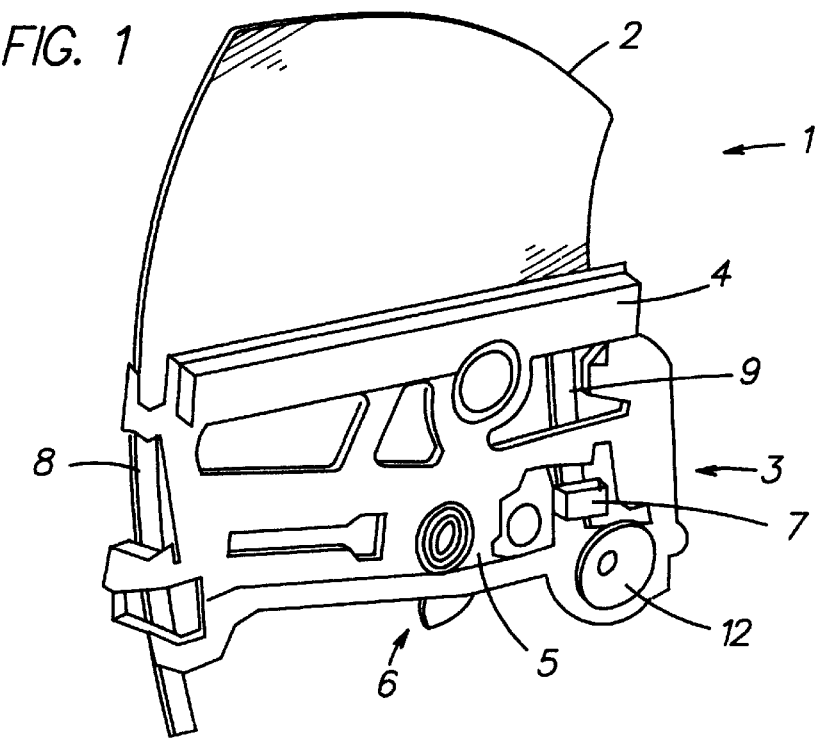
FIG. 1 is an is isometric view of a partial undercarriage of a vehicle door module.

Referring to FIG. 1, there is shown a vehicle door module, generally designated as 1, including window glass 2. Structural portion 3 of vehicle door module 1 includes box section belt 4 and hardware support cross member 5 which may be comprised of a metal, plastic, composite or other structurally suitable material. Also included in vehicle door module 1 is a window regulator 6, including a below belt lift and guidance system, and further comprised of a motor 7, rear glass guide channel 8, and front glass guide channel 9 for supporting and raising and lowering window glass 2. Vehicle door module 1 further includes inside handle and latch system 10, wire harness assembly 11 and speaker 12. Inside handle and latch system 10 and window regulator system 6 are fully tested prior to installation of vehicle door module 1 into a vehicle door assembly 20 (FIG. 2).

Figure 2:
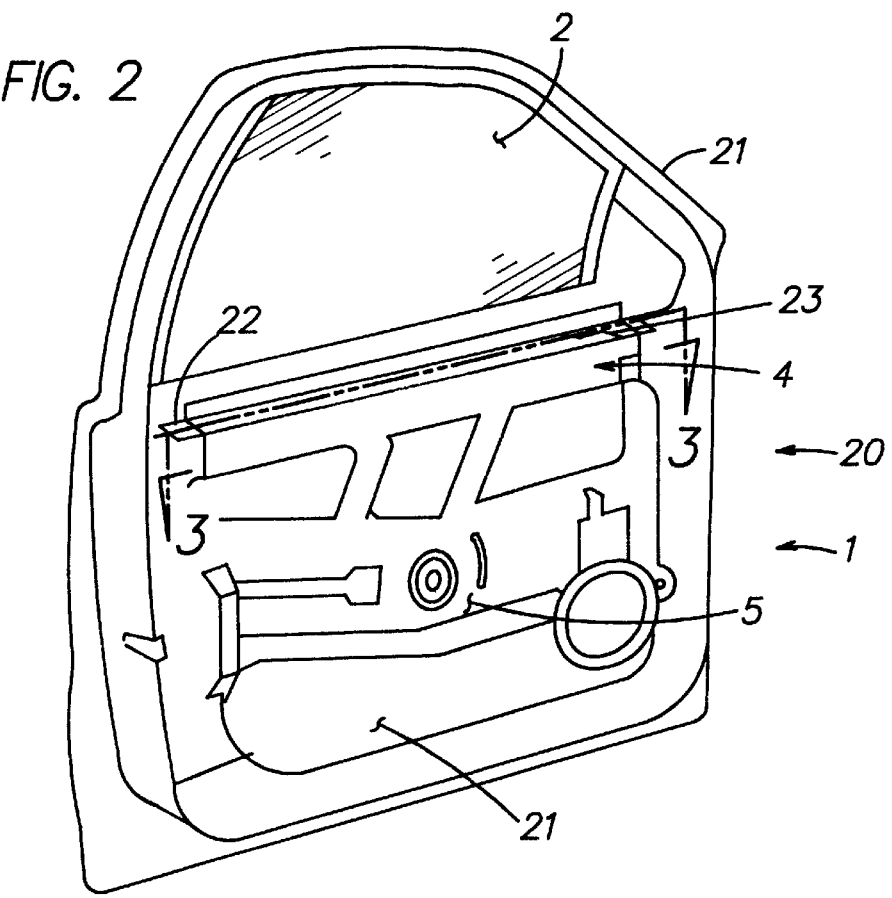
FIG. 2 is an isometric view of a vehicle door assembly showing the installation of a vehicle door module.

As best shown in FIG. 2 vehicle door module 1, including window glass 2, is installed into door frame 21 from the inboard side. The incorporation of box section belt 4 into vehicle door module 1 permits such installation over that of prior art door modules as discussed herein before. Box section belt 4 of vehicle door module 1 is structurally attached to door frame 21 via angled bolt attachment 22 and double overlap attachment 23 in a manner which closely replicates the strength and rigidity of the prior art.

The structural attachment of box section belt 4 to door frame 21 is best shown in FIGS. 3 and 4. In the embodiment shown, door frame 21, in the proximity of the belt, is comprised of a box section as is box section belt 4. Angled bolt attachment 22 is comprised of face 24 on door frame 21 which mates with face 25 on box section belt 4. Bolt 26 is threadably engaged within nut 27 to secure angle attachment 22 to the door frame 21. Faces 24, 25 are positioned at an angle 28 ranging from approximately 45 degrees to 60 degrees to transfer loads along the belt 4 as will be more fully described below. Double overlap attachment 23 is comprised of face 29 on door frame 21 and face 30 on box section belt 4 with bolt 31 threadably engaged within nut 32 to secure the attachment to the door frame 21. Faces 29, 30 include interlocking ridges 33 to transfer loads along the belt 4 as will be more fully described below. For ease of assembly nuts 27, 32 may comprise a weld nut or be permanently attached to within box section belt 4 and door frame 21 or may be attached by other suitable means.

FIG. 5 shows an alternative embodiment for attachment of box section belt 4 wherein studs 50 are welded to or otherwise are permanently attached within belt 4 and door frame 21. In this embodiment the installation of door module 1 is facilitated by the ability to temporarily position module 1 on door frame 21 without the installation of fasteners.

Although the present invention is shown as comprising angle attachment 22 and double overlap attachment 23, it is within the scope of the present invention that box section belt 4 is attached to door frame 21 via a pair of double overlap joints 23.

In practice, vehicle door module 1 is pre-assembled to include the above referenced components as best seen in FIG. 1. Vehicle door module 1 is then assembled to door frame 21 via box section belt 4 and hardware support cross member 5. In the attachment of box section belt 4 bolt 26 is passed through clearance holes 34, 35, 36 and engaged within nut 27 and subsequently tightened to draw faces 24, 25 together at angled bolt attachment 22. Clearance hole 34 is shaped, in this case elliptically, to permit insertion of a tool (not shown) to facilitate installation of bolt 26. Clearance holes 35, 36 are sized to permit clearance for bolt 26 while providing for alignment of door frame 21 and box section belt 4. At double overlap attachment 23, bolt 31 is passed through clearance holes 37, 38, 39 and engaged within nut 32 and subsequently tightened to engage interlocking ridges 33 thereby fixing attachment 23. Clearance hole 37 is sized to permit insertion of a tool (not shown) to facilitate installation of bolt 31. Gaps 40, 41 are provided between box section belt and door frame 4 and clearance hole 38 is shaped, in this case as an elongated slot, to allow for manufacturing tolerances and build variability in the positioning box section belt 4 relative to door frame 21.

Still referring to FIG. 3 vehicle door module 1 may alternatively include inside door trim panel 42. Trim panel 42 includes access holes 43, 44 for installation of bolts 26, 32 respectively, thereby permitting the fastening of box section belt 4 to door frame 21. Beauty buttons 45, 46 are then installed within access holes 43, 44 to cover the holes from view. Another advantage of angle attachment 22 is that beauty button 46 projects rearward away from the view of a passenger within the vehicle.

Vehicle door module 1 maintains the structural integrity and rigidity of prior art vehicle doors through the unique attachments of box section belt 4 and door frame 21. As best seen in FIG. 3, a load transferred into angled bolt attachment 22 is reacted through the joint by reaction between faces 24, 25 as well as shear and, in some cases, tension within bolt 26. Angle 28 may be varied from between about 45 degrees to 60 degrees to direct a large proportion of the load along the length of the beam without being transferred through bolt 26. Similarly, a load transferred into double overlap attachment 23 is reacted through the joint by the faces 29, 30 through clamping forces provided by bolt 31, as well as through shear and tension capability of the bolt itself. In addition, the engagement of interlocking ridges 33 enhances the load transfer capability of double overlap attachment 23. In an embodiment comprising a pair of double overlap joints a load transferred into each of the double overlap attachments 23 is reacted through the joint by the faces 29, 30 through clamping forces provided by bolt 31, as well as through shear and tension capability of the bolt itself.

It will be understood that a person skilled in the art may make modifications to the preferred embodiments shown herein within the scope and intent of the claims. While the present invention has been described as carried out in a specific embodiment thereof, it is not intended to be limited thereby but is intended to cover the invention broadly within the scope and spirit of the claims.

What is claimed is:

1. A door module including a hardware support cross member for a door assembly of a vehicle, the door assembly including a frame having a first surface and first and second beveled edges, the door module comprising:

a structural belt attached to the hardware support cross member, wherein the structural belt includes a second surface which is complementary to the first surface of the frame, the structural belt having third and fourth beveled edges which are complentary to and face the first and second beveled edges, the first beveled edge engaging the third beveled edge in an interlocking manner and the second beveled edge engaging the fourth beveled edge in an interlocking manner to provide for effective load transfer between the first and second surfaces;

a window regulator system attached to the hardware support cross member and the structural belt; and a window disposed within the regulator system.

2. A door module as set forth in claim 1 wherein the structural belt is comprised of a box section member and further comprises an angled bolt attachment at a first end and a double over lap attachment at a second end.

3. A door module as set forth in claim 2 wherein the angled bolt attachment comprises a first attachment face positioned at a predetermined angle on the first end of the structural belt and the double overlap attachment comprises a second attachment face positioned at the second end of the structural belt.

4. A door module as set forth in claim 3 wherein the predetermined angle ranges from about 45 degrees to about 60 degrees.

5. A door module as set forth in claim 3 wherein the second attachment face includes a plurality of ridges disposed thereon.

6. A door module as set forth in claim 1 further comprising a wiring harness and an inside handle and latch system.

7. A door module as set forth in claim 1 wherein the structural belt is comprised of a box section member and further comprises a double over lap attachment positioned at a first end and at a second end.

8. A door module as set forth in claim 1, wherein the structural belt is received within an opening formed in the frame such that the structural belt is disposed between the frame, the structural belt including an outer surface which is contiguous with an outer surface of the frame.

9. A door assembly for a vehicle, the door assembly comprising:

a frame having a first surface and first and second beveled edges; and a door module comprising a hardware support cross member attached to the frame, a structural belt attached to the frame and the hardware support cross member, wherein the structural belt includes a second surface which is complementary to the first surface of the frame, the structural belt including third and fourth beveled edges which are complementary to and face the first and second beveled edges so that the first beveled edge engages the third beveled edge in an interlocking manner and the second beveled edge engages the fourth beveled edge in an interlocking manner, at least a portion of the structural belt being disposed between the first and second beveled edges of the frame, the interlocking between the frame and the structural belt providing for effective load transfer therebetween, a window regulator system attached to the hardware support cross member and the belt, and a window disposed within the regulator system.

10. A door assembly as set forth in claim 9 wherein the structural belt is comprised of a box section member and further comprises an angled bolt attachment at a first end attaching to the frame and a double over lap attachment at a second end attaching to the frame.

11. A door module as set forth in claim 10 wherein the angled bolt attachment comprises a first attachment face positioned at a predetermined angle on the first end of the structural belt disposed in contact with a first mating face positioned at a complimentary angle on the frame and the double overlap attachment comprises a second attachment face positioned at the second end of the structural belt disposed in contact with a second mating face on the frame.

12. A door assembly as set forth in claim 11 wherein the predetermined angle ranges from about 45 degrees to about 60 degrees.

13. A door assembly as set forth in claim 11 wherein the second attachment face includes a plurality of first ridges disposed thereon engaging a second plurality of ridges disposed on the second mating face.

14. A door assembly as set forth in claim 11 further comprising:
a clearance hole disposed in the first mating face;
a hole disposed in the first attachment face including a set of internal threads disposed therein;
a bolt disposed within the clearance hole and engaged within the internal threads.

15. A door assembly as set forth in claim 11 further comprising:
a clearance hole disposed in the second mating face;
a hole disposed in the second attachment face including a set of internal threads disposed therein;
a bolt disposed within the clearance hole and engaged within the internal threads.

16. A door assembly as set forth in claim 11 further comprising:
a clearance hole disposed in the first mating face;
a stud extending from the first attachment face including a set of external threads disposed therein;
a nut disposed within the clearance hole and engaged with the external threads.

17. A door assembly as set forth in claim 9 wherein the module further comprises a wiring harness and an inside handle and latch system.

18. A door module as set forth in claim 9 wherein the structural belt is comprised of a box section member and further comprises a double over lap attachment positioned at a first end and at a second end.

19. A door assembly as set forth in claim 8, wherein the structural belt is received within an opening formed in the frame such that the structural belt is disposed between the frame, the structural belt including an outer surface which is contiguous with an outer surface of the frame.

20. A door module including a hardware support cross member for a door assembly of a vehicle, the door assembly including a frame having a first surface, the door module comprising:
a structural belt attached to the hardware support cross member, wherein the structural belt includes a second surface which is complementary to the first surface of the frame, the second surface the first beveled edge engaging the first surface in an interlocking manner manner to provide for effective load transfer therebetween, wherein the frame includes third and fourth surfaces with the first surface being disposed intermediate to the third and fourth surfaces, the third and fourth surfaces being angled relative to the first surface, the first surface being an interlocking surface for engaging the complementary second surface;
a window regulator system attached to the hardware support cross member and the structural belt; and
a window disposed within the regulator system.

21. A door module including a hardware support cross member for a door assembly of a vehicle, the door assembly including a frame having a first surface, the door module comprising:
a structural belt attached to the hardware support cross member, wherein the structural belt includes a second surface which is complementary to the first surface of the frame, the second surface the first beveled edge engaging the first surface in an interlocking manner manner to provide for effective load transfer therebetween, wherein the structural belt includes third and fourth surfaces with the second surface being disposed intermediate to the third and fourth surfaces, the third and fourth surfaces being angled relative to the second surface, the second surface being an interlocking surface for engaging the complementary first surface;
a window regulator system attached to the hardware support cross member and the structural belt; and
a window disposed within the regulator system.

22. A door assembly for a vehicle, the door assembly comprising:
a frame having a first surface; and
a door module comprising a hardware support cross member attached to the frame, a structural belt attached to the frame and the hardware support cross member, wherein the structural belt includes a second surface which is complementary to the first surface of the frame, that the second surface engaging the first surface in an interlocking manner to provide for effective load transfer therebetween, a window regulator system attached to the hardware support cross member and the belt, and a window disposed within the regulator system, wherein the frame includes third and fourth surfaces with the first surface being disposed intermediate to the third and fourth surfaces, the third and fourth surfaces being angled relative to the first surface, the first surface being an interlocking surface for engaging the complementary second surface.

23. A door assembly for a vehicle, the door assembly comprising:
a frame having a first surface; and a door module comprising a hardware support cross member attached to the frame, a structural belt attached to the frame and the hardware support cross member, wherein the structural belt includes a second surface which is complementary to the first surface of the frame, that the second surface engaging the first surface in an interlocking manner to provide for effective load transfer therebetween, a window regulator system attached to the hardware support cross member and the belt, and a window disposed within the regulator system, wherein the structural belt includes third and fourth surfaces with the second surface being disposed intermediate to the third and fourth surfaces, the third and fourth surfaces being angled relative to the second surface, the second surface being an interlocking surface for engaging the complementary first surface.

* * * * *